Jan. 17, 1939. E. L. WIEDMAN 2,144,303
TRAILER SUPPORT
Filed Sept. 3, 1937 2 Sheets—Sheet 2
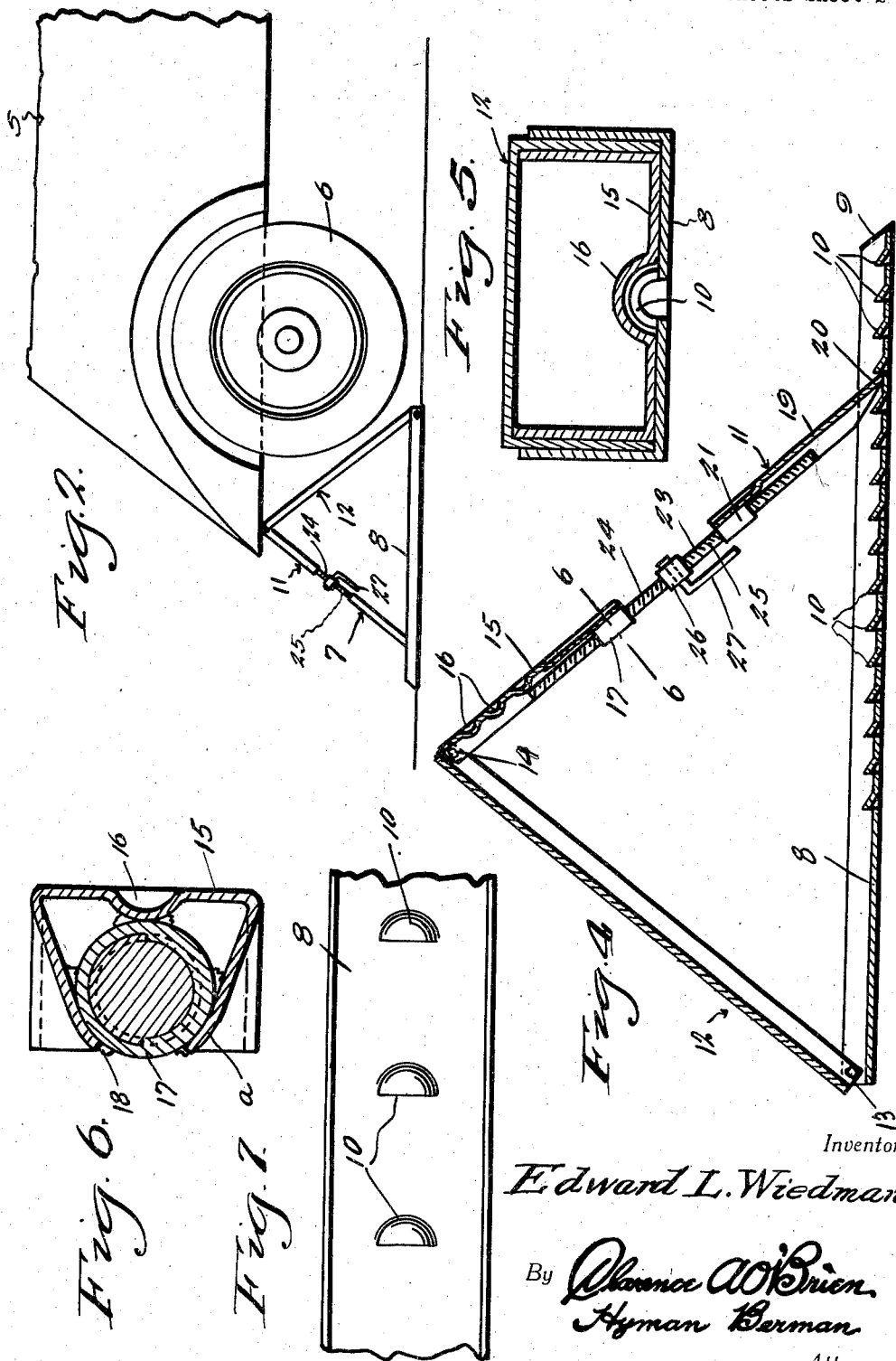
Inventor
Edward L. Wiedman
By Clarence A. O'Brien
Hyman Berman
Attorneys Patented Jan. 17, 1939

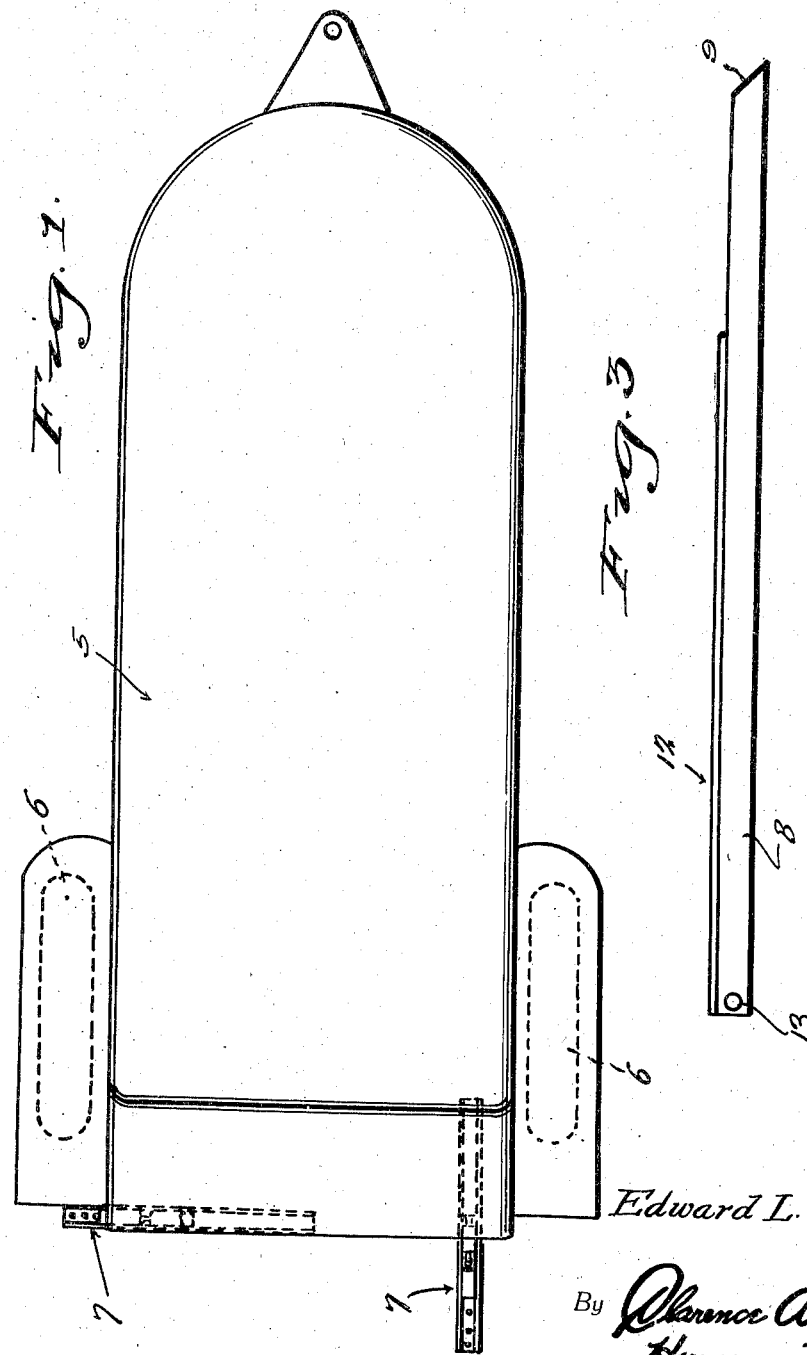

2,144,303

UNITED STATES PATENT OFFICE 2,144,303

TRAILER SUPPORT

Edward L. Wiedman, Tonawanda, N. Y.

Application September 3, 1937, Serial No. 162,345

1 Claim. (Cl. 254—126)

This invention relates to new and useful improvements in supports or jacks for trailers.

The principal object of the present invention is to provide an adjustable support for disposition under trailers whereby trailers can be lifted so that their wheels will not contact the ground and furthermore whereby the floors of trailers can be levelled when the trailer is in fact overlying uneven ground.

Other objects and advantages of the invention will become apparent to the reader from the following specification.

In the drawings:

Figure 1 represents a top plan view of a trailer showing the approximate disposition of a pair of the supports.

Figure 2 is a fragmentary side elevational view of the trailer equipped with one of the supports.

Figure 3 is a side elevational view of the support or jack in collapsed condition.

Figure 4 is a vertical sectional view through the support in extended position.

Figure 5 is an enlarged cross sectional view of the support in collapsed position.

Figure 6 is an enlarged detail sectional view taken substantially on the line 6—6 of Figure 4.

Figure 7 is a fragmentary top plan view of the base member.

Referring to the drawings wherein like numerals designate like parts, it can be seen in Figure 1 that numeral 5 denotes a conventional trailer having the usual wheels 6.

Numeral 7 generally refers to the novel support or shank construction and this includes an elongated channelled base member 8 bevelled at one end as at 9 and formed for a substantial distance inwardly from the end 9 with upstanding stop members 10 longitudinally spaced at equal spaced intervals and being formed by transversely slitting the bottom of the channelled member 8 and forcing one edge portion of the channelled member upwardly in this slit. Thus the stop members are formed and are cooperative with the leg assembly generally referred to by numeral 11.

Numeral 12 generally refers to the other leg assembly which is of channelled construction and is hinged at one end as at 13 to the remaining end of the base 8 and at its opposite end is hingedly connected as at 14 to one end of the leg assembly 11.

This leg assembly 11 consists of the upper channelled member 15 which on the outer side of its bottom is provided with indentations 16 to accommodate certain of the stops 10 when the support is in collapsed position as shown in Figure 3.

The side walls of this channelled member 15 at the free ends thereof are constricted as at $a$ against the nut 17 and at this point the side walls of the channelled member 15 are welded as at 18 to the nut 17.

The lower section 19 of the leg assembly 11 is also of counter-construction, its lower end being bevelled as at 20 to form a point for engagement with the stop 10 while its upper end has its side walls converged inwardly and welded to the nut 21. Numeral 22 denotes a screw having a right-hand threaded portion 24 and the left-hand threaded portion at 25, the former being disposed into the nut 17 while the latter is disposed through the nut 21. A block 26 is carried by the intermediate portion of this screw 23 and receives swivelly the laterally disposed end portion of the handle 27. Obviously by swinging the handle 27 laterally of the screw 23, the handle can be used to rotate the screw and separate the sections 15—19 of the leg assembly 11 when elevation is desired or by reverse rotation of the screw to contract these sections in reducing the height of the support, and this is very desirable in levelling properly the floor of the trailer on uneven ground.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A jack of the character described comprising a base member, a link member having one end secured to one end of the base, an adjustable leg member having one end pivotally secured to the remaining end of the link member, stops on the base member with which the leg member is engageable, said leg member being divided into upper and lower channeled sections disposed in aligned relation, and extending and contracting means between the leg sections confined in the channels of said sections, the lower section being tapered for engagement with the stop on the base member.

EDWARD L. WIEDMAN.